(12) United States Patent
Feng et al.

(10) Patent No.: US 11,093,081 B2
(45) Date of Patent: Aug. 17, 2021

(54) DETECTION CIRCUIT AND ELECTRONIC DEVICE

(71) Applicant: SHENZHEN GOODIX TECHNOLOGY CO., LTD., Shenzhen (CN)

(72) Inventors: Lin Feng, Shenzhen (CN); Guanjun Zhang, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 66 days.

(21) Appl. No.: 16/693,200

(22) Filed: Nov. 22, 2019

(65) Prior Publication Data

US 2020/0089386 A1    Mar. 19, 2020

Related U.S. Application Data

(63) Continuation of application No. PCT/CN2018/100280, filed on Aug. 13, 2018.

(51) Int. Cl.
*G06F 3/041* (2006.01)
*G06F 3/044* (2006.01)

(52) U.S. Cl.
CPC ........ *G06F 3/04182* (2019.05); *G06F 3/0443* (2019.05)

(58) Field of Classification Search
CPC ... G06F 3/04182; G06F 3/0443; G06F 3/0416
See application file for complete search history.

(56) References Cited

U.S. PATENT DOCUMENTS

| | | | | |
|---|---|---|---|---|
| 2013/0027338 | A1* | 1/2013 | Nishimura | G06F 3/0443 345/173 |
| 2016/0124544 | A1* | 5/2016 | Kang | G06F 3/0446 345/174 |
| 2017/0123486 | A1 | 5/2017 | Willis et al. | |
| 2018/0004349 | A1* | 1/2018 | Gicquel | G06F 3/044 |
| 2018/0209858 | A1* | 7/2018 | Feng | G06F 3/044 |
| 2018/0300016 | A1* | 10/2018 | Gicquel | G06F 3/044 |

FOREIGN PATENT DOCUMENTS

| | | |
|---|---|---|
| CN | 106648268 A | 5/2017 |
| CN | 107562227 A | 1/2018 |
| CN | 107980115 A | 5/2018 |
| CN | 108124474 A | 6/2018 |

OTHER PUBLICATIONS

The Chinese International Search Report, including Written Opinion Report of corresponding International application No. PCT/CN2018/100280, dated May 14, 2019.

* cited by examiner

*Primary Examiner* — Benyam Ketema
(74) *Attorney, Agent, or Firm* — J.C. Patents

(57) ABSTRACT

The present disclosure provides a detection circuit and an electronic device. The detection circuit includes a driving circuit, a cancelling circuit, and a switching circuit. Each driving module of the driving circuit is coupled to a detection capacitor for charging it; each cancelling module of the cancelling circuit is coupled to the detection capacitor to perform capacitance cancellation through two directions; each cancelling module of the cancelling circuit is coupled to the switching module to perform conversion of a capacitive signal and then output. The present disclosure can improve a detection accuracy of the capacitor.

18 Claims, 7 Drawing Sheets

DETECTION CIRCUIT AND ELECTRONIC DEVICE

CROSS-REFERENCE TO RELATED APPLICATION

This application is a continuation of International Application No. PCT/CN2018/100280, filed on Aug. 13, 2018, the application of which is hereby incorporated by reference in its entirety.

TECHNICAL FIELD

Embodiments of the present disclosure relate to detection technologies, and in particular, to a detection circuit and an electronic device.

BACKGROUND

With the development of information technology, more and more electronic devices detect outside physical signals through capacitance detection technology.

In the capacitance detection technology, a corresponding signal to be detected can be detected by detecting a change in a detection capacitor. In some scenarios, an original capacitance is larger, but its variable quantity is very small, and if a detection sensitivity is smaller, a change value of the capacitance may not be detected, thereby affecting the detection of the signal to be detected.

Therefore, how to improve the detection sensitivity of capacitance and realize the accurate detection of capacitance seems to be particularly important.

SUMMARY

Embodiments of the present disclosure provide a detection circuit and an electronic device to improve a detection sensitivity and detection accuracy of capacitance.

An embodiment of the present disclosure provides a detection circuit, including: a driving circuit, a cancelling circuit, and a switching circuit;

the driving circuit includes at least one driving module; each driving module is coupled to at least one detection capacitor and is configured to periodically charge the one detection capacitor;

the cancelling circuit includes at least one cancelling module; each cancelling module is coupled to the one detection capacitor and is configured to cancel an initial capacitance of the one detection capacitor by charge transfer in two directions; and the switching circuit includes at least one switching module; the each cancelling module is further coupled to one switching module, which is configured to, after the initial capacitance of the one detection capacitor is cancelled, convert a capacitive signal of the one detection capacitor to a voltage signal and output.

In a possible implementation, each driving module includes: a driving voltage source, a first switch, and a second switch;

the driving voltage source is coupled to one terminal of the one detection capacitor through the first switch; the other terminal of the one detection capacitor is coupled to a ground; and the one terminal of the one detection capacitor is also coupled to the ground through the second switch.

In another possible implementation, each cancelling module includes: a cancelling voltage source, a cancelling capacitor, a third switch, a fourth switch, a fifth switch, a sixth switch, and a seventh switch;

one terminal of the cancelling capacitor is coupled to the one detection capacitor through the third switch; the one terminal of the cancelling capacitor is also coupled to the cancelling voltage source through the fourth switch, and is also coupled to the ground through the fifth switch; and the other terminal of the cancelling capacitor is also coupled to the cancelling voltage source through the sixth switch, and is also coupled to the ground through the seventh switch.

In yet another possible implementation, the cancelling capacitor is a tunable capacitor or a fixed capacitor.

In yet another possible implementation, the driving voltage source and the cancelling voltage source are a same voltage source.

In yet another possible implementation, each switching module includes: an eighth switch, a ninth switch, a feedback capacitor, and an operational amplifier;

each cancelling module is coupled to an inverting input terminal of the operational amplifier through the eighth switch;

the feedback capacitor is coupled between the inverting input terminal of the operational amplifier and an output terminal of the operational amplifier; the ninth switch is also coupled between the inverting input terminal of the operational amplifier and the output terminal of the operational amplifier; and a non-inverting input terminal of the operational amplifier is coupled with a common mode voltage source.

In yet another possible implementation, an output voltage of the common mode voltage source is ½ of the driving voltage source.

In yet another possible implementation, the circuit further includes:

a filter, an analog to digital converter ADC and a digital signal processor DSP;

an output terminal of the switching circuit is coupled to the filter; the filter is coupled to the ADC, and the ADC is further coupled to the DSP;

the filter is configured to perform band pass filtering on at least one path of voltage signal output by the at least one switching module;

the ADC is configured to convert at least one path of filtered signal into a digital signal; and the DSP is configured to perform in-phase quadrature IQ demodulation on the digital signal and then output.

In yet another possible implementation, if the number of the detection capacitors is multiple, then the ADC is further configured to perform differential processing on multiple paths of filtered signals, and then convert them into digital signals.

An embodiment of the present disclosure may further provide an electronic device, including: a detection circuit, where the detection circuit may be any one of the detection circuits described above.

In the detection circuit and the electronic device provided by the embodiments of the present disclosure, the detection circuit may include a driving circuit, a cancelling circuit, and a switching circuit, where the driving circuit includes at least one driving module; each driving module is coupled to at least one detection capacitor and is configured to periodically charge the one detection capacitor, the cancelling circuit includes at least one cancelling module; each cancelling module is coupled to the one detection capacitor and is configured to cancel an initial capacitance of the one detection capacitor by charge transfer in two directions, the switching circuit includes at least one switching module; and each cancelling module is further coupled to a switching module, which is configured to, after the initial capacitance of the one detection capacitor is cancelled, convert a capacitive signal of the one detection capacitor to a voltage signal and output. In the detection circuit, each cancelling module of the cancelling circuit can implement cancellation of the initial capacitance of one detection capacitor by charge transfer in two directions, and the cancelling efficiency is higher, and a detection sensitivity and detection accuracy of capacitance are improved. At the same time, a dynamic range of capacitance detection can also be improved.

BRIEF DESCRIPTION OF DRAWINGS

In order to more clearly illustrate the technical solutions in the embodiments of the present disclosure or in the prior art, the drawings needed to be used in the description of the embodiments or the prior art will be briefly described below. Obviously, the drawings in the following description are some embodiments of the present disclosure, for those skilled in the art, other drawings can be obtained according to these drawings without any creative efforts.

DESCRIPTION OF EMBODIMENTS

In order to make the objects, technical solutions and advantages of the embodiments of the present disclosure more clear, the technical solutions in the embodiments of the present disclosure will be clearly and completely described in combination with the drawings in the embodiments of the present disclosure. Obviously, the described embodiments are part of the embodiments of the present disclosure, but not all of the embodiments. Based on the embodiments of the present disclosure, all other embodiments obtained by those skilled in the art without creative efforts are within the protection scope of the present disclosure.

All technical and scientific terms used herein have a same meaning as commonly understood by technical personnel in the technical field of the present disclosure, unless otherwise defined. The terms used in the description of the present disclosure herein is only for a purpose of describing particular embodiments, and are not intended to limit the present disclosure. The term "and/or" used herein includes any and all combinations of one or more related listed items. Some implementations of the present disclosure are described in detail below in combination with the accompanying drawings. The embodiments and the features in the embodiments described below can be combined with each other when there is no conflict.

The detection circuit and the electronic device provided by the following various embodiments of the present disclosure can be applied to devices employing capacitance detection, such as active capacitance styluses, passive capacitance styluses, mobile terminals, tablet computers, home appliance devices, safety devices, and the like, especially to a detection field having weak capacitance. For example, capacitive pressure sensors being suitable for active styluses, capacitive touch screens of mobile phones or tablets or the like, capacitive buttons, capacitive touch screens with multi-point Hover detection, capacitive touch screens of proximity sensing, capacitive touch screens for detection scenarios such as rain and snow or the like or other types of capacitive sensors or the like.

It should be noted that a "capacitor" involved in the following various embodiments may also be referred to as a "capacitor device", and a capacitive signal of the capacitor may be referred to as a capacitive signal of the capacitor device, where, the capacitive signal of the capacitor may be a capacitive value signal of the capacitor, and may also be a capacitance variation signal of the capacitor. For convenience of description, in the present disclosure, a capacitor, and a capacitive signal of the capacitor are illustrated as examples.

Figure 1:
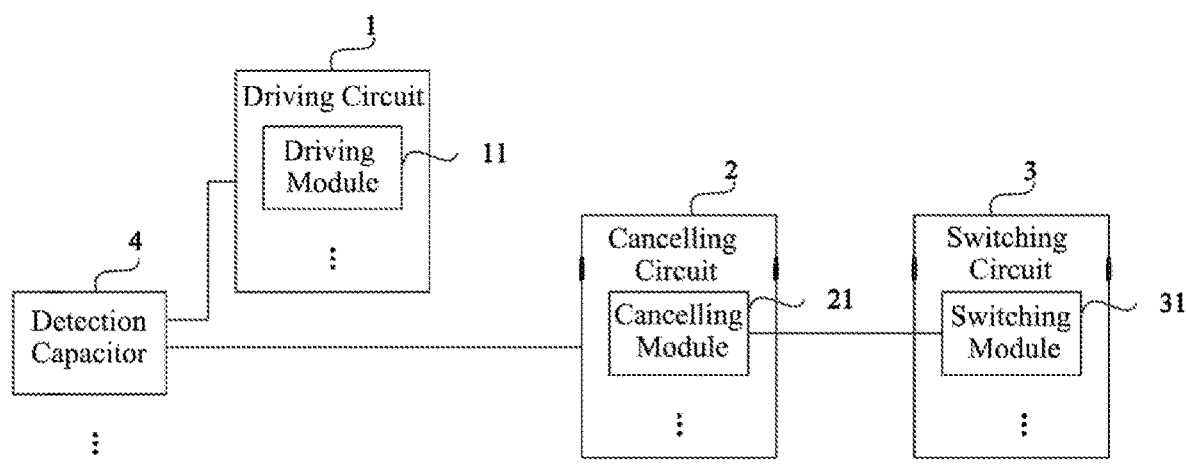
FIG. 1 is a first schematic structural diagram of a detection circuit according to an embodiment of the present disclosure.

FIG. 1 is a first schematic structural diagram of a detection circuit according to an embodiment of the present disclosure. As shown in FIG. 1, the detection circuit may include the following: a driving circuit 1, a cancelling circuit 2, and a switching circuit 3.

The driving circuit 1 includes at least one driving module 11, and each driving module 11 is coupled to at least one detection capacitor 4 and is configured to periodically charge the one detection capacitor 4.

The cancelling circuit 2 includes at least one cancelling module 21, each cancelling module 21 is coupled to one detection capacitor 4 and is configured to cancel an initial capacitance of the one detection capacitor 4 by charge transfer in two directions.

The switching circuit 3 includes at least one switching module 31; each cancelling module 31 is further coupled to one switching module 31, which is configured to, after the initial capacitance of the one detection capacitor 4 is cancelled, convert a capacitive signal of the one detection capacitor 4 into a voltage signal and output.

For example, periodical charging of the one detection capacitor 4 coupled to each driving module 11 can be performed by switching through a switch.

The initial capacitance of one detection capacitor 4 may be an initial capacitance caused by the one detection capacitor 4 and a distributed capacitance of an input terminal of the detection circuit or the like. The initial capacitance of the one detection capacitor 4 can also be referred to as an initial capacitance of one detection capacitor 4.

For example, each cancelling module 21 can cancel a negative charge in the initial capacitance of the one detection capacitor 4 by positive charge transfer in a period of time; and cancel a positive charge in the initial capacitance of the one detection capacitor 4 by negative charge transfer in another period of time. Thereby, each cancelling module 21 achieves cancellation of the initial capacitance of the one detection capacitor 4, so that when the capacitance of the one detection capacitor 4 does not change, the output is zero, and the signal output by the switching module 31 coupled to the one detection capacitor 4 is an actual capacitive signal of the one detection capacitor.

In the present disclosure, each cancelling module 21 can implement cancellation of the initial capacitance of one detection capacitor 4 by charge transfer in two directions, the cancelling efficiency is higher, and the capacitance detection sensitivity and detection accuracy are improved, and the dynamic range of the capacitance detection can also be improved.

Regardless of whether the initial capacitance of the one detection capacitor 4 is cancelled, each switching module 31 can convert the capacitive signal of one detection capacitor 4 into a voltage signal and output. That is to say, in a period of time, each switching module 31 can convert the capacitive signal of the one detection capacitor 4 into the voltage signal and output after the initial capacitance of the one detection capacitor 4 is cancelled, and in the other periods of time, each switching module 31 can convert the capacitive signal of the one detection capacitor 4 into the voltage signal and output, before the initial capacitance of the one detection capacitor 4 is cancelled, or during the cancelling.

Because, in the detection circuit, each driving module 11 can periodically charge one detection capacitor 4, each cancelling module 21 can cancel the initial capacitance of one detection capacitor 4, and each switching module 31 can convert the capacitive signal of the one detection capacitor 4 into the voltage signal and output after the initial capacitance of the one detection capacitor 4 is cancelled. Therefore, the detection circuit can realize capacitance detection for at least one detection capacitor.

That is to say, in the detection circuit, one detection path can be provided for one detection capacitor 4, and on the one detection path, one detection capacitor 4 is coupled to one driving module 11 and also coupled to one cancelling module 21, and the one cancelling module 21 may also be coupled to one switching module 31.

The detection circuit provided by the embodiment of the present disclosure may include a driving circuit, a cancelling circuit, and a switching circuit, where the driving circuit includes at least one driving module, and each driving module is coupled to at least one detection capacitor and is configured to periodically charge the one detection capacitor; the cancelling circuit includes at least one cancelling module, and each cancelling module is coupled to the one detection capacitor and is configured to cancel an initial capacitance of the one detection capacitor by charge transfer in two directions; the switching circuit includes at least one switching module, and the each cancelling module is further coupled to one switching module and is configured to convert a capacitive signal of the one detection capacitor into a voltage signal and output, after the initial capacitance of the one detection capacitor is cancelled. In the detection circuit, cancellation of the initial capacitance of detection capacitor can be implemented through charge transfer in two directions by each cancelling module 21 of the cancelling circuit, which has a higher cancelling efficiency, and the capacitance detection sensitivity and detection accuracy are improved. At the same time, the dynamic range of capacitance detection can also be improved.

Figure 2:
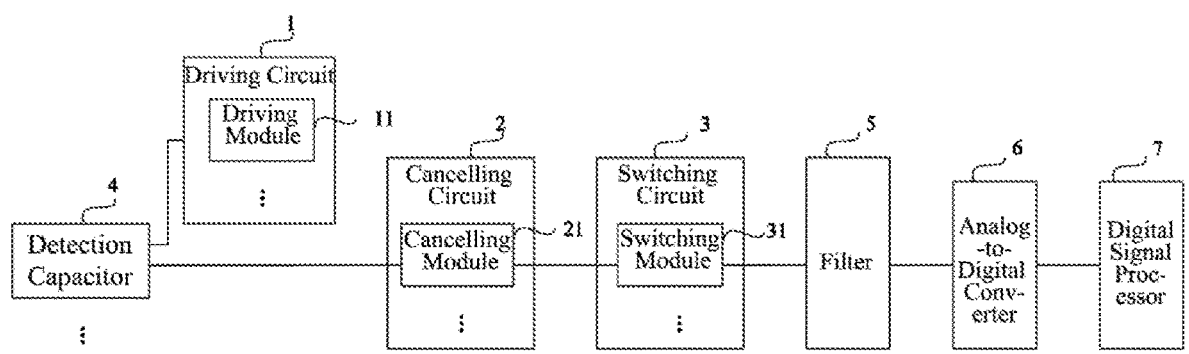
FIG. 2 is a second schematic structural diagram of a detection circuit according to an embodiment of the present disclosure.

Based on the detection circuit described above, an embodiment of the present disclosure may further provide a detection circuit. FIG. 2 is a second schematic structural diagram of a detection circuit according to an embodiment of the present disclosure. As shown in FIG. 2, the detection circuit may further include: a filter 5, an Analog-to-Digital Converter (ADC) 6 and a Digital Signal Processor (DSP) 7.

The filter 5 can be an analog signal filter, such as an Analog Antialiasing Filter (AAF). The filter 5 can be coupled to an output terminal of the above switching circuit 3.

The output terminal of each switching module 31 of the above switching circuit 3 can be coupled to the filter 5 to send the voltage signal output by each switching module 31 to the filter 5. At least one path of voltage signal output by the at least one switching module 31 is performed with band-pass filtering by the filter 5, for filtering out out-of-band noise or filtering processing, such as antialiasing filtering.

The filter 5 is also coupled to the ADC 6, and is configured to send at least one path of filtered signal to the ADC 6, and the ADC 6 converts the at least one path of filtered signal into a digital signal.

The ADC 6 is also coupled to the DSP 7 and configured to perform IQ demodulation of the digital signal and output, where the DSP 7 may be integrated on a Touch Integrated Circuit (Touch IC) or a Central Processing Unit (CPU), or may be integrated on other circuits or chips.

In the detection circuit, being filtered by the filter 5 and sent to the ADC 6 can effectively suppress harmonic interference, improve the Signal-to-Noise Ratio (SNR) of the detection circuit, and improve the anti-interference ability. At the same time, the digital signal is performed with the IQ demodulation by the DSP 7, so that a channel of the circuit is not easily saturated, and a signal detection bandwidth is reduced.

Optionally, if the number of the detection capacitor 4 is multiple, then the ADC 6 is further configured to perform a differential processing on multiple paths of filtered signals, and then convert them into digital signals.

If the number of the detection capacitor 4 is multiple, then the filter 5 can input the multiple paths of filtered signals into a differential input channel of the ADC 6 by means of differential inputs; or input the multiple paths filtered signals into multiple channels of the ADC 6.

Among the multiple detection capacitors 4, one detection capacitor 4 may be an actual detection capacitor, and the other at least one detection capacitor 4 may serve as a reference capacitor of the one detection capacitor 4. Among the multiple detection capacitors 4, the material of the different detection capacitors 4 may be the same.

In the detection circuit, when the number of the detection capacitor 4 is multiple, after performing the differential processing on multiple paths of filtered signals, and converting them into the digital signals, the ADC 6 can provide environmental compensation for part of the detection capacitors, and suppress a capacitance measurement error caused by temperature drift, deformation, or the like furthest, which improves the accuracy of capacitance detection.

An example of capacitance detection of one detection capacitor by a detection circuit having one detection path is illustrated in the following first.

Figure 3:
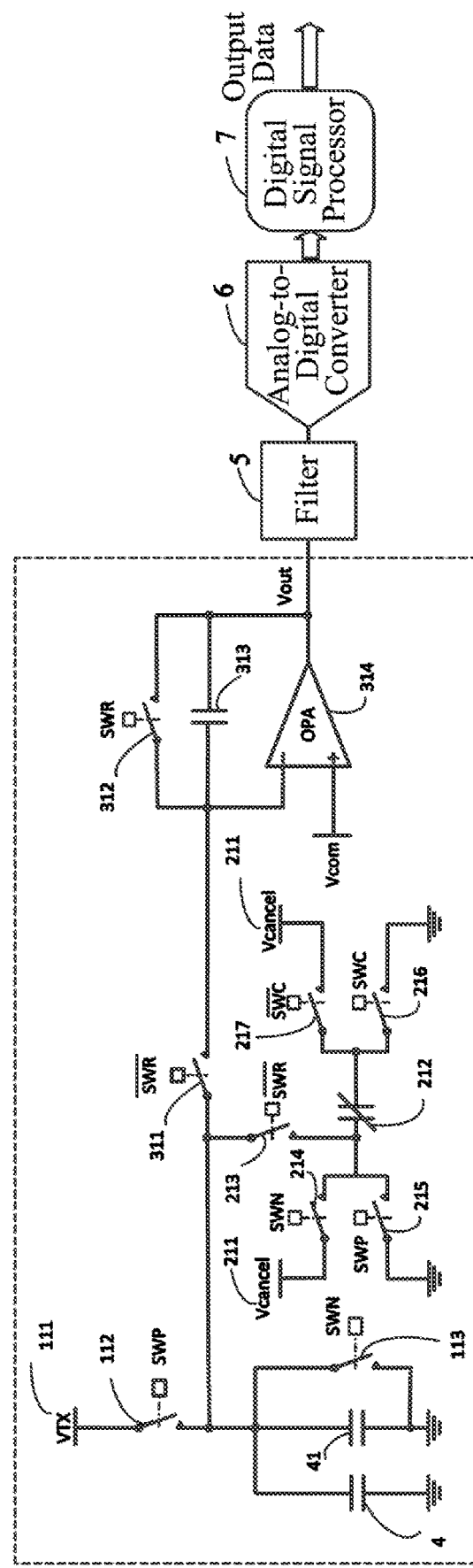
FIG. 3 is a third schematic structural diagram of a detection circuit according to an embodiment of the present disclosure.

FIG. 3 is a third schematic structural diagram of a detection circuit according to an embodiment of the present disclosure. The detection circuit can be illustrated by a case of one detection capacitor on the basis of the above as shown in FIG. 1 or FIG. 2. If there is one detection capacitor, then in the detection circuit shown in FIG. 1 or FIG. 2, the driving circuit 1 includes one driving module 11, the cancelling circuit 2 includes one cancelling module 21, and the switching circuit 3 includes one switching module 31. As shown in FIG. 3, the detection circuit can be based on the detection circuit shown in FIG. 2, where each driving module 11 may include a driving voltage source 111, a first switch 112, and a second switch 113.

The driving voltage source 111 is coupled to one terminal of one detection capacitor 4 through the first switch 112; and the other terminal of the one detection capacitor 4 is coupled to a ground.

The one terminal of the one detection capacitor 4 is also coupled to the ground through the second switch 113.

The one detection capacitor 4 can be represented as Cx, and a connection relationship of an initial capacitance 41 of the one detection capacitor 4 is similar. That is, one terminal of the initial capacitor 41 is also coupled to the driving voltage source 111 through the first switch 112, and the other terminal is also coupled to the ground, and the one terminal of the initial capacitor 41 is also coupled to the ground through the second switch 113. The initial capacitance 41 can be represented as Cbase. The driving voltage source 111 can be represented as Vtx.

The on and off of the first switch 112 can be controlled by a first control signal, which can be represented as SWP. The on and off of the second switch 113 can be controlled by a second control signal, which can be represented as SWN.

When the first switch 112 is controlled to be on by the first control signal, the driving voltage source 111 can charge the detection capacitor 4 and the initial capacitor 41 of the one detection capacitor 4. When the first switch 112 is controlled to be off by the first control signal, the driving voltage source 111 stops charging the detection capacitor 4 and the initial capacitor 41 of the one detection capacitor 4. Through controlling the on and off of the first switch 112 by the first control signal, the periodically charging by the driving voltage source 111 for the detection capacitor 4 and the initial capacitor 41 of the one detection capacitor 4 can be realized.

To ensure the charging of the detection capacitor 4 and the initial capacitor 41 of the one detection capacitor 4, while the first switch 112 is controlled to be on by the first control signal, the second switch 113 can also be controlled to be off by the second control signal, to avoid short circuit of the detection capacitor 4.

Optionally, in the detection circuit shown above, each cancelling module 21, the cancelling module 21 may include: a cancelling voltage source 211, a first cancelling capacitor 212, a third switch 213, a fourth switch 214, a fifth switch 215, a sixth switch 216 and a seventh switch 217.

One terminal of the first cancelling capacitor 212 is coupled to one detection capacitor 4 through the third switch 213; one terminal of the first cancelling capacitor 212 is also coupled to the cancelling voltage source 211 through the fourth switch 214, and is also coupled to the ground through the fifth switch 215.

The other terminal of the first cancelling capacitor 212 is also coupled to the ground through the sixth switch 216, and is also coupled to the cancelling voltage source 211 through the seventh switch 217.

The cancelling voltage source 211 can be referred to as Vcancel, and the first cancelling capacitor 212 can be referred to as Ccancel1. In this embodiment, the first cancelling capacitor 212 can be a tunable capacitor or a fixed preset capacitor. If the first cancelling capacitor 212 is a tunable capacitor, an integrated area of the detection circuit can be simplified, and a circuit cost can be reduced. At the same time, an applicable range of the capacitance detection of the detection circuit can be greatly improved.

The on and off of the third switch 213 can be controlled by a reverse signal of a third control signal, where the third control signal may be represented as SWR, and the reverse signal of the third control signal may be represented as $\overline{SWR}$. The on and off of the fourth switch 214 can be controlled by the second control signal. The on and off of the fifth switch 215 can be controlled by the first control signal. The on and off of the sixth switch 216 can be controlled by a fourth control signal. The on and off of the seventh switch 217 can be controlled by a reverse signal of the fourth control signal. Where the fourth control signal can be represented as SWC, and the reverse signal of the fourth control signal can be represented as $\overline{SWC}$.

For example, in the process of charging the detection capacitor 4 by the driving voltage source 111, the third switch 213 can be controlled to be off by the reverse signal of the third control signal, and the second switch 113 can be controlled to be off by the second control signal.

When the third switch 213 is off, the fourth switch 214 can also be controlled to be off by the second control signal, the fifth switch 215 is controlled to be on by the first control signal, the sixth switch 216 is controlled to be off by the fourth control signal, and the seventh switch 217 is controlled to be on by the reverse signal of the fourth control signal, and the cancelling voltage source 211 can perform reverse charging for the first cancelling capacitor 212.

After the reverse charging of the first cancelling capacitor 212 has accomplished, the third switch 213 can be controlled to be on by the reverse signal of the third control signal, the fourth switch 214 is controlled to be off by the second control signal, the fifth switch 215 is controlled to be off by the first control signal, the sixth switch 216 is controlled to be on by the fourth control signal, and the seventh switch 217 is controlled to be off by the reverse signal of the fourth control signal, and positive charge transfers to the initial capacitor 41 through the first cancelling capacitor 212, achieving cancellation of negative charge of the initial capacitor 41.

In this embodiment, the second switch 113 can also be controlled to be on by the second control signal to short-circuit the detection capacitor 4. At the same time, the third switch 213 can be controlled to be off by the reverse signal of the third control signal, the fourth switch 214 is controlled to be on by the second control signal, the fifth switch 215 is controlled to be off by the first control signal, the sixth switch 216 is controlled to be on by the fourth control signal, and the seventh switch 217 is controlled to be off by the reverse signal of the fourth control signal, so that the cancelling voltage source 211 positively charges the first cancelling capacitor 212.

After positive charging of the first cancelling capacitor 212 has accomplished, the second switch 113 can be controlled to be off by the second control signal, the third switch 213 is controlled to be on by the reverse signal of the third control signal, the fourth switch 214 is controlled to be off by the second control signal, the fifth switch 215 is controlled to be off by the first control signal, the sixth switch 216 is controlled to be off by the fourth control signal, and the seventh switch 217 is controlled to be on by the reverse signal of the fourth control signal, and negative charge transfers to the initial capacitor 41 through the first cancelling capacitor 212 to achieve cancellation of positive charge of the initial capacitor 41.

Therefore, the detection circuit of the embodiment of the present disclosure can implement bidirectional charge cancellation of the initial capacitor 41, and the cancelling efficiency is higher.

Optionally, the driving voltage source 211 and the cancelling voltage source 212 may be a same voltage source or different voltage sources.

If the driving voltage source 211 and the cancelling voltage source 212 are the same voltage source, the power supply design in the detection circuit can be simplified.

Optionally, each switching module 31 may include an eighth switch 311, a ninth switch 312, a first feedback capacitor 313, and a first operational amplifier (OPA) 314.

The cancelling module 21 is coupled to an inverting input terminal of the first operational amplifier 314 through the eighth switch 311.

The first feedback capacitor 313 is coupled between the inverting input terminal of the first operational amplifier 314 and an output terminal of the first operational amplifier 314; the ninth switch 312 is also coupled between the reverse input terminal of the first operational amplifier 314 and the output terminal of the first operational amplifier 314.

A non-inverting input terminal of the first operational amplifier 314 is coupled with a common mode voltage source.

The cancelling module 21 may be the structure shown above, or may be other similar structures. The drawings are merely examples, and the present disclosure does not limit.

The on and off of the eighth switch 311 can be controlled by the reverse signal of the third control signal, and the on and off of the ninth switch 312 can be controlled by the third control signal.

In combination with the above example, in a charging phase of the detection capacitor 4 and a reverse charging phase of the first cancelling capacitor 212, the ninth switch 312 can be controlled to be on by the third control signal, so that the first feedback capacitor 313 is shorted and its capacitance is reset. In the charging phase of the detection capacitor 4, the first operational amplifier 314 outputs a converted voltage signal Vout after the circuit is stabilized.

In a positive charge transfer phase, the ninth switch 312 can be controlled to be off by the third control signal, and the eighth switch 311 is controlled to be on by the reverse signal of the third control signal, so that the first operational amplifier 314 can convert a capacitive signal, which is obtained after the charge of the initial capacitor 41 of the detection capacitor 4 is cancelled, into a voltage signal Vout and output it.

In a positive charging phase of the first cancelling capacitor 212, the ninth switch 312 can be controlled to be on by the third control signal, so that the first feedback capacitor 313 is shorted, causing the capacitance of the first feedback capacitor 313 to be reset, and the eighth switch 311 is controlled to be off by the reverse signal of the third control signal. In the positive charging phase of the first cancelling capacitor 212, the first operational amplifier 314 outputs a converted voltage signal Vout after the circuit is stabilized.

In a negative charge transfer phase, the ninth switch 312 can be controlled to be off by the third control signal, and the eighth switch 311 is controlled to be on by the reverse signal of the third control signal, so that the first operational amplifier 314 can convert a capacitive signal, which is obtained after the charge of the initial capacitor 41 of the detection capacitor 4 is cancelled, into a voltage signal Vout and output it.

Optionally, an output voltage of the common mode voltage source is ½ of the driving voltage source 111.

Setting the output voltage of the common mode voltage source to ½ of the driving voltage source 111 can make a dynamic range of the first operational amplifier 314 larger.

An example is illustrated in the following with reference to working timing waveforms of the detection circuit.

Figure 4:
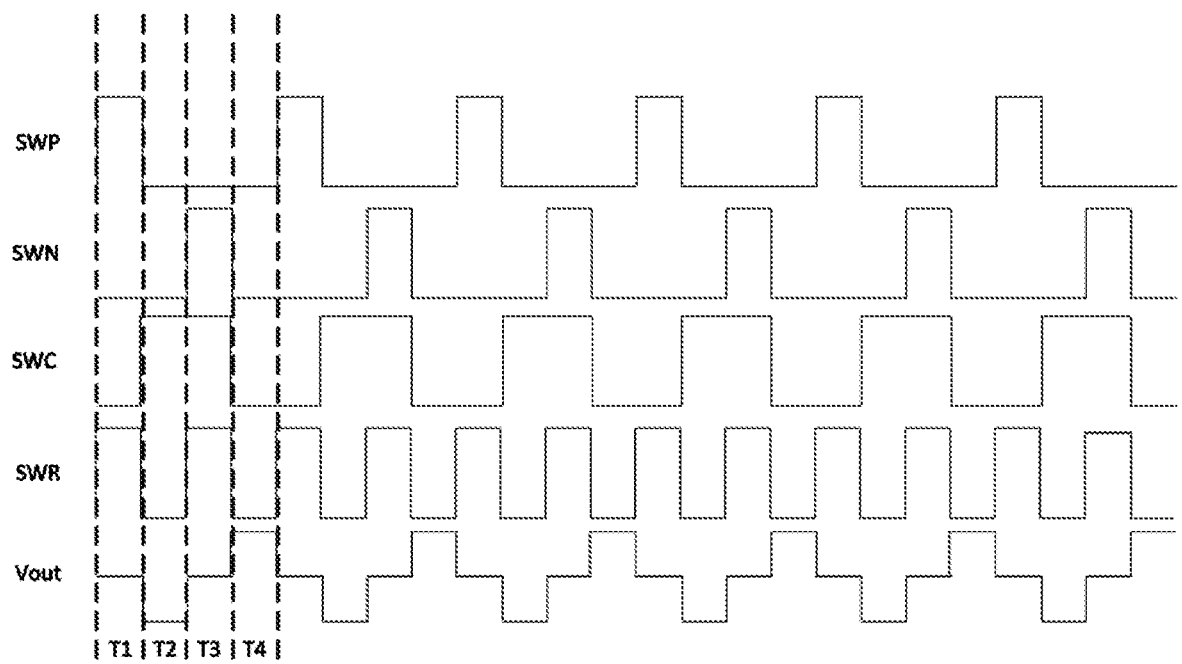
FIG. 4 is a first working timing waveform diagram of a detection circuit according to an embodiment of the present disclosure.

FIG. 4 is a first working timing waveform diagram of a detection circuit according to an embodiment of the present disclosure. In the working timing waveform diagram shown in FIG. 4, waveforms of the first control signal SWP, the second control signal SWN, the third control signal SWR, the fourth control signal SWC, and the voltage signal Vout output by the first operational amplifier 314 are shown.

According to FIG. 4, one detection cycle of the detection circuit may include: four periods of time, denoted as T1, T2, T3, and T4, respectively. This one detection cycle can also be referred to as one driving cycle.

T1 is a charging period of the detection capacitor, and is also a reverse charging period of the first cancelling capacitor 212.

In the T1 period, the on and off of corresponding switches in the detection circuit can be controlled by the first control signal SWP, the second control signal SWN, the third control signal SWR, and the fourth control signal SWC shown in FIG. 4, so that the driving voltage source 111 can charge the detection capacitor 4, the cancelling voltage source 211 can reverse charge the first cancelling capacitor 212, and the first feedback capacitor 313 can be shorted and reset. When the circuit is stabilized, the first operational amplifier 314 operationally amplifies and outputs a voltage signal Vout of the T1 period as shown in FIG. 4.

A voltage output by the first operational amplifier 314 in the T1 period has a relationship with the common mode voltage source and the driving voltage source 111 as shown in the following formula (1).

$$Vout_{T1} = Vcom = \frac{VTX}{2} \quad \text{Formula (1)}$$

where $Vout_{T1}$ is the voltage output by the first operational amplifier 314 in the T1 period. Vcom is a voltage of the common mode voltage source. VTX is a voltage of the driving voltage source. Vcom may be 0.5 VTX.

T2 is a positive charge transfer time period, also called a cancelling time period.

In the T2 period, the on and off of corresponding switches in the detection circuit can be controlled by the first control signal SWP, the second control signal SWN, the third control signal SWR and the fourth control signal SWC shown in FIG. 4, so that the positive charge can transfer to the initial capacitor 41 through the first cancelling capacitor 212 to realize the cancellation of the negative charge of the initial capacitor 41. When the circuit is stabilized, the first operational amplifier 314 operationally amplifies and outputs a voltage signal Vout of the T2 period as shown in FIG. 4.

A voltage output by the first operational amplifier 314 in the T2 period has a relationship with the driving voltage source 111, the capacitance of the initial capacitor 41, the capacitance of the first cancelling capacitor 212, the cancelling voltage source 211, the first feedback capacitor 313, and the capacitance of the detection capacitor 4 as shown in the following formula (2).

$$Vout_{T2} = \frac{VTX}{2} - \frac{VTX(Cbase - Ccancel1) - 2Vcancel * Ccancel1}{2 * Cfb1} - \frac{Cx}{2 * Cfb1} \quad \text{Formula (2)}$$

where $Vout_{T2}$ is the voltage output by the first operational amplifier 314 in the T2 period. VTX is the voltage of the driving voltage source. Cbase is the capacitance of the capacitor 41, Ccancel1 is the capacitance of the first cancelling capacitor 212, Vcancel is a voltage of the cancelling voltage source 211, Cfb1 is a capacitance of the first feedback capacitor 313, and Cx is the capacitance of the detection capacitor 4.

T3 is a positive charging period of the first cancelling capacitor 212.

In the T3 period, the on and off of corresponding switches in the detection circuit can be controlled by the first control signal SWP, the second control signal SWN, the third control signal SWR, and the fourth control signal SWC shown in FIG. 4, so that the detection capacitor 4 can be shorted, the cancelling voltage source 211 positively charges the first cancelling capacitor 212, and the first feedback capacitor 313 be shorted and reset. When the circuit is stabilized, the first operational amplifier 314 operationally amplifies and outputs a voltage signal Vout of the T3 period as shown in FIG. 4.

A voltage output by the first operational amplifier 314 in the T3 period has a relationship with the common mode voltage source and the driving voltage source 111 as shown in the following formula (3).

$$Vout_{T3} = Vcom = \frac{VTX}{2} \quad \text{Formula (3)}$$

where $Vout_{T3}$ is the voltage output by the first operational amplifier 314 in the T3 period. Vcom is the voltage of the common mode voltage source. VTX is the voltage of the driving voltage source. Vcom may be 0.5 VTX.

T4 is a negative charge transfer time period, also called a cancelling time period.

In the T4 period, the on and off of corresponding switches in the detection circuit can be controlled by the first control signal SWP, the second control signal SWN, the third control signal SWR and the fourth control signal SWC shown in FIG. 4, so that the negative charge can transfer to the initial capacitor 41 through the first cancelling capacitor 212, to achieve the cancellation of the positive charge of the initial capacitor 41. When the circuit is stabilized, the first operational amplifier 314 operationally amplifies and outputs a voltage signal Vout of the T4 period as shown in FIG. 4.

A voltage output by the first operational amplifier 314 in the T4 period has a relationship with the driving voltage source 111, the capacitance of the initial capacitor 41, the capacitance of the first cancelling capacitor 212, the cancelling voltage source 211, the capacitance of the first feedback capacitor 313, and the capacitance of the detection capacitor 4 as shown in the following formula (4).

$$Vout_{T2} = \frac{VTX}{2} + \frac{VTX(Cbase - Ccancel1) - 2Vcancel * Ccancel1}{2 * Cfb1} + \frac{Cx}{2 * Cfb1} \quad \text{Formula (4)}$$

where $Vout_{T4}$ is the voltage output by the first operational amplifier 314 in the T4 period. VTX is the voltage of the driving voltage source. Cbase is the capacitance of the capacitor 41, Ccancel1 is the capacitance of the first cancelling capacitor 212, Vcancel is the voltage of the cancelling voltage source 211, Cfb1 is the capacitance of the first feedback capacitor 313, and Cx is the capacitance of the detection capacitor 4.

According to the above formula (2) and formula (4), the capacitance of the first cancelling capacitor 212 and the cancelling voltage source 211 together determine the cancelling efficiency of the detection circuit.

When the cancelling voltage source 211 is equal to the driving voltage source 111, the circuit structure can be effectively simplified, so that the cancelling voltage source 211 and the driving voltage source 111 share the same voltage source. In this case, the detection circuit can cancel three times the initial capacitance 41 of the first cancelling capacitor 212, that is, when the capacitance of the first cancelling capacitor 212 and the initial capacitance 41 satisfy the following formula (5), the detection circuit can completely cancel the initial capacitor 41.

$$Ccancel1 = \frac{Cbase}{3} \quad \text{Formula (5)}$$

In the present disclosure, the capacitance of the first cancelling capacitor 212 can also be reduced by increasing a ratio of the cancelling voltage source 211 and the driving voltage source 111 to improve utilization of the cancelling capacitor.

After the initial capacitor 41 is completely cancelled, the voltage output by the first operational amplifier 314 in the T2 period may have a relationship with the driving voltage source 111, the capacitance of the initial capacitor 41, and the first feedback capacitor 313 as shown in the following formula (6). The voltage output by the first operational amplifier 314 in the T4 period may have a relationship with the driving voltage source 111, the capacitance of the initial capacitance 41, and the first feedback capacitance 313 as shown in the following formula (7).

$$Vout_{T2} = \frac{VTX}{2} - \frac{Cx}{2 * Cfb1} \quad \text{Formula (6)}$$

$$Vout_{T4} = \frac{VTX}{2} + \frac{Cx}{2 * Cfb1} \quad \text{Formula (7)}$$

In the working timing waveform diagram shown in FIG. 4, the waveform of the voltage signal Vout output by the first operational amplifier 314 in one detection cycle is a three-level convex wave, and half of the time (T1 and T3 periods) is driving periods, in which the first operational amplifier 314 has no effective voltage output.

Optionally, in order to increase a duty ratio of the voltage signal Vout output by the first operational amplifier 314, to facilitate subsequent analog-to-digital conversion performed by the ADC 6 and IQ demodulation performed by the DSP 7, the first control signal SWP, the second control signal SWN, the third control signal SWR, and the fourth control signal SWC shown in FIG. 4 may be adjusted to minimize the T1 period and the T3 period and maximize the T2 period and the T4 period under a premise that the detection capacitor 4 and the first cancelling capacitor 212 can accomplish charging.

Figure 5:
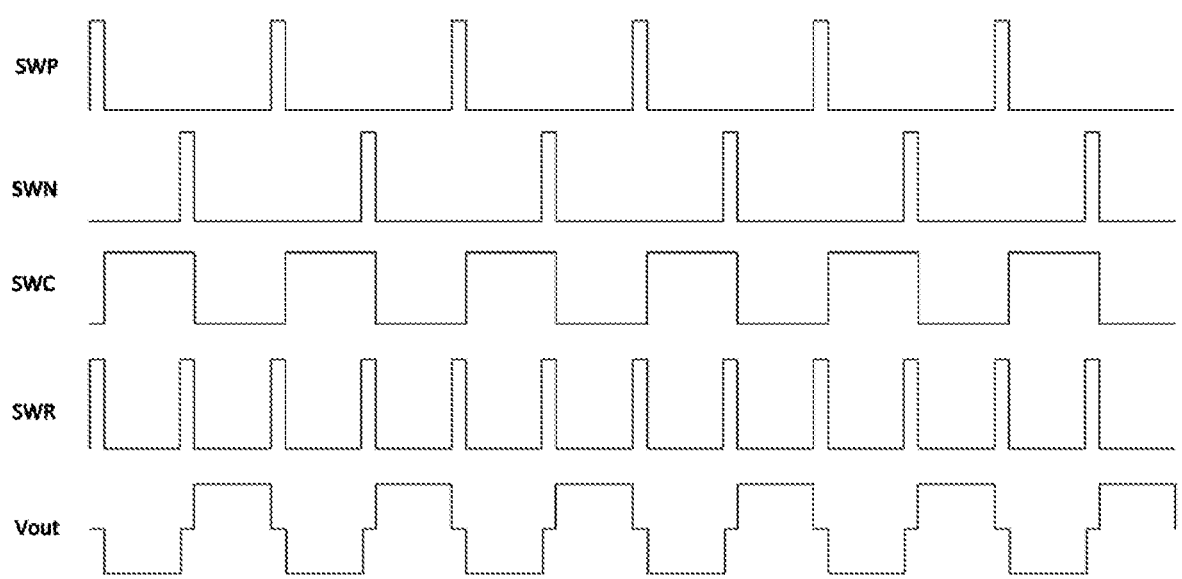
FIG. 5 is a second working timing waveform diagram of a detection circuit according to an embodiment of the present disclosure.

FIG. 5 is a second working timing waveform diagram of a detection circuit according to an embodiment of the present disclosure. In this embodiment, the first control signal SWP, the second control signal SWN, the third control signal SWR, and the fourth control signal SWC shown in FIG. 5 can be obtained by adjusting the first control signal SWP, the second control signal SWN, the third control signal SWR and the fourth control signal SWC, such that the voltage signal Vout output by the first operational amplifier 314 is as shown in FIG. 5, which is closer to a square wave signal.

In this case, after the voltage signal is subjected to an analog-to-digital conversion by an ADC 6 and an IQ demodulation by a DSP 7, a fundamental wave utilization of the driving voltage source is higher, and the system has a stronger anti-interference ability, thereby ensuring the accuracy of capacitance detection of the detection circuit.

In the detection circuit shown in FIG. 3, the output terminal of the first operational amplifier 314 can be coupled to a filter 5 to send the output voltage signal of the first operational amplifier 314 to the filter 5. The filter 5 can perform band pass filtering on the output voltage signal of the first operational amplifier 314 for filtering out out-of-band noise or pre-processing, such as antialiasing filtering.

In the detection circuit, digital signals sampled by the ADC 6 are processed by processing algorithms such as digital filtering, IQ demodulation and digital integration by the DSP 7. Since IQ demodulation is employed for the digital signal obtained by the ADC 6, the detection scheme has an advantage of suppressing harmonic interference. By digitally integrating the I and Q values, a channel saturation problem introduced by an analog terminal integration is avoided, and in addition, the integration time of the digital integration circuit can be flexibly increased or decreased according to actual application scenarios, thereby reducing a signal detection bandwidth and improving the system SNR and anti-interference ability.

The following continues to illustrate an example for the capacitance detection of one detection capacitor by a detection circuit having two detection paths.

Figure 6:
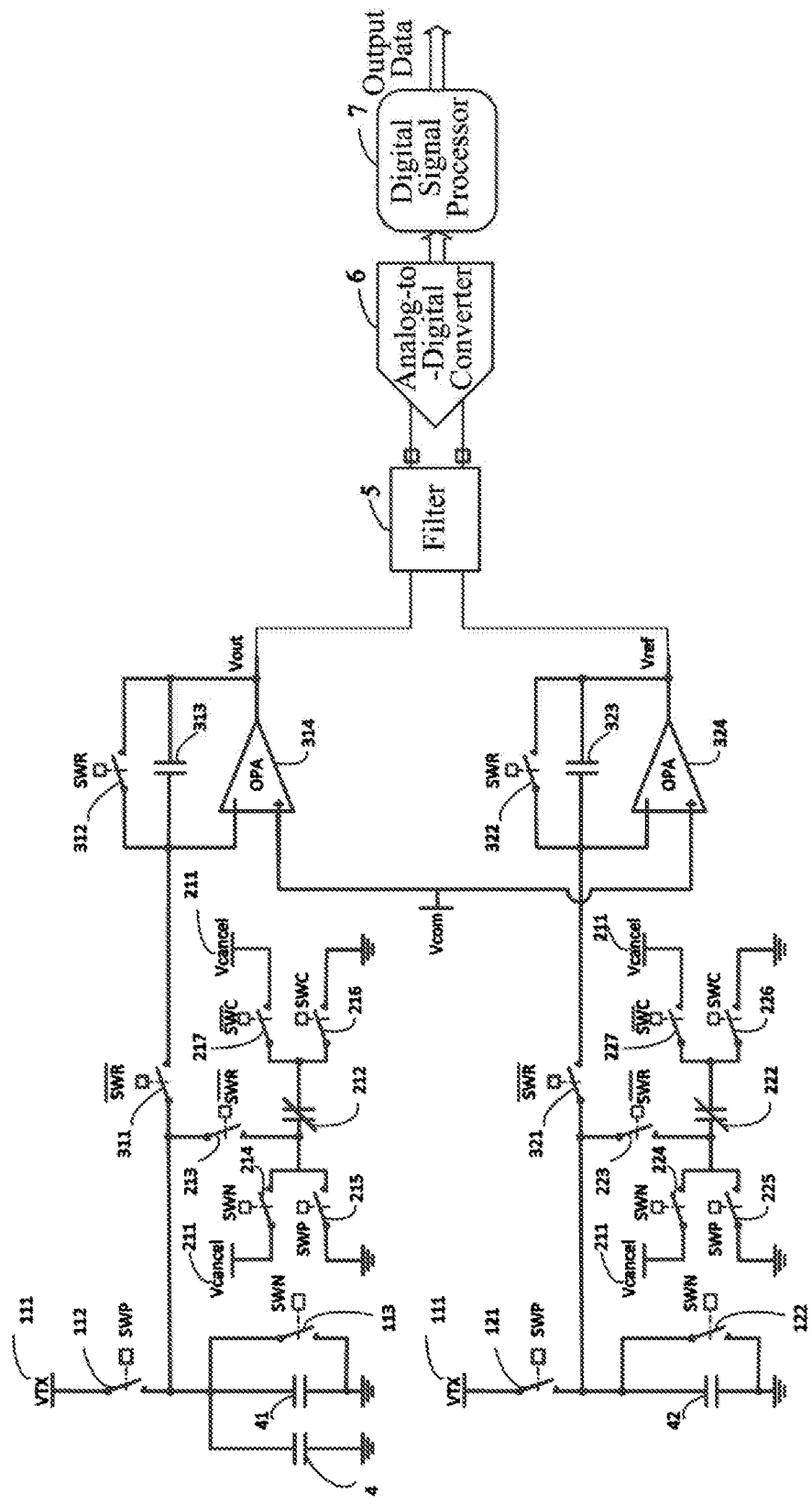
FIG. 6 is a fourth schematic structural diagram of a detection circuit according to an embodiment of the present disclosure.

FIG. 6 is a fourth schematic structural diagram of a detection circuit according to an embodiment of the present disclosure. The detection circuit can be illustrated by an example where the capacitance detection of one detection capacitor is performed with reference to a reference capacitor on the basis as the above FIG. 3 shown. It is noted that, in the example corresponding to FIG. 6, only an example of one reference capacitor is shown, there may also have multiple reference capacitors. If multiple reference capacitors are included, the sampling path for each reference capacitor may be similar to that of the following reference capacitor 42, and details will not be described herein again.

As shown in FIG. 6, a detection circuit is based on the circuit shown in the above FIG. 3, where each driving module 11 may further include an eleventh switch 121 and a twelfth switch 122.

The driving voltage source 111 can be coupled to one terminal of the reference capacitor 42 through the eleventh switch 121, and the other terminal of the reference capacitor 42 is coupled to the ground. The one terminal of the reference capacitor 42 is also coupled to the ground through the twelfth switch 122.

The reference capacitor 42 can be a capacitor having a same material as the detection capacitor 4. The reference capacitor 42 can be denoted as Cref.

The on and off of the eleventh switch 121 can be controlled by the first control signal, which can be denoted as SWP. The on and off of the twelfth switch 113 can be controlled by the second control signal, which can be denoted as SWN.

When the eleventh switch 121 is controlled to be on by the first control signal, the driving voltage source 111 can perform charging for the reference capacitor 42. When the eleventh switch 121 is controlled to be off by the first control signal, the driving voltage source 111 stops charging for the reference capacitor 42. The periodically charging of the reference capacitor 42 by the driving voltage source 111 can be realized by controlling the on and off of the eleventh switch 121 by the first control signal.

In order to ensure the charging of the reference capacitor 42, while the eleventh switch 121 is controlled to be on by the first control signal, the eleventh switch 122 is also controlled to be off by the second control signal to avoid shorting of the reference capacitor 42.

Optionally, in the detection circuit shown above, each cancelling module 21 may further include: a second cancelling capacitor 222, a thirteenth switch 223, a fourteenth switch 224, a fifteenth switch 225, a sixteenth switch 226, and the seventeenth switch 227.

One terminal of the second cancelling capacitor 222 is coupled to the reference capacitor 42 through the thirteenth switch 223; the one terminal of the second cancelling capacitor 222 is also coupled to the cancelling voltage source 211 through the fourteenth switch 224, and is also coupled to the ground through the fifteenth switch 225.

The other terminal of the second cancelling capacitor 222 is also coupled to the ground through the sixteenth switch 226, and is also coupled to the cancelling voltage source 211 through the seventeenth switch 227.

The second cancelling capacitor 222 can be a tunable capacitor or a fixed preset capacitor. If the second cancelling capacitor 222 is a tunable capacitor, the integrated area of the detection circuit can be simplified, and the circuit cost can be reduced.

The on and off of the thirteenth switch 223 can be controlled by the reverse signal of the third control signal, the third control signal may be represented as SWR, and the reverse signal of the third control signal may be represented as $\overline{SWR}$. The on and off of the fourteenth switch 224 can be controlled by the second control signal. The on and off of the fifteenth switch 225 can be controlled by the first control signal. The on and off of the sixteenth switch 226 can be controlled by the fourth control signal. The on and off of the seventeenth switch 227 can be controlled by the reverse signal of the fourth control signal. Where the fourth control signal can be represented as SWC, and the reverse signal of the fourth control signal can be represented as $\overline{SWC}$.

For example, in the process of charging the reference capacitor 42 by the driving voltage source 111, the thirteenth switch 223 can be controlled to be off by the reverse signal of the third control signal, and the twelfth switch 122 can be controlled to be off by controlling the second control signal. When the thirteenth switch 223 is off, the fourteenth switch 224 can also be controlled to be off by the second control signal, the fifteenth switch 225 is controlled to be on by the first control signal, the sixteenth switch 226 is controlled to be off by the fourth control signal, and the seventeenth switch 227 is controlled to be on by the reverse signal of the fourth control signal, so that the cancelling voltage source 211 can perform reverse charging for the second cancelling capacitor 222.

After the reverse charging of the second cancelling capacitor 222 has accomplished, the thirteenth switch 223 can be controlled to be on through the reverse signal of the third control signal, the fourteenth switch 224 is controlled to be off by the second control signal, the fifteenth switch 225 is controlled to be off by the first control signal, the sixteenth switch 226 is controlled to be on by the fourth control signal, and the seventeenth switch 227 is controlled to be off by the reverse signal of the fourth control signal, and the positive charge transfers to the reference capacitor 42 through the second cancelling capacitor 222 to achieve cancellation of negative charge of the reference capacitor 42.

In this embodiment, the twelfth switch 122 can also be controlled to be on by the second control signal to make the reference capacitor 42 be shorted. At the same time, the thirteenth switch 223 can also be controlled to be off by the reverse signal of the third control signal, the fourteenth switch 224 is controlled to be on by the second control signal, the fifteenth switch 225 is controlled to be off by the first control signal, the sixteenth switch 226 is controlled to be on by the fourth control signal, and the seventeenth switch 227 is controlled to be off by the reverse signal of the fourth control signal, so that the cancelling voltage source 211 positively charges the second cancelling capacitor 222.

After the positive charging of the second cancelling capacitor 222 has accomplished, the twelfth switch 122 can be controlled to be off by the second control signal, the thirteenth switch 223 is controlled to be on by the reverse signal of the third control signal, the fourteenth switch 224 is controlled to be off by the second control signal, the fifteenth switch 225 is controlled to be off by the first control signal, the sixteenth switch 226 is controlled to be off by the fourth control signal, and the seventeenth switch 227 is controlled to be on by the reverse signal of the fourth control signal, the negative charge transfers to the reference capacitor 42 through the second cancelling capacitor 222, implementing cancellation of the positive charge of the reference capacitor 42.

Therefore, the detection circuit of the embodiment of the present disclosure can realize bidirectional charge cancellation of the reference capacitor 42, and the cancelling efficiency is higher.

Optionally, each switching module 31 may further include: an eighteenth switch 321, a nineteenth switch 322, a second feedback capacitor 323, and a second operational amplifier 324.

The cancelling module 21 is coupled to an inverting input terminal of the second operational amplifier 324 through the eighteenth switch 321.

The second feedback capacitor 323 is coupled between the inverting input terminal of the second operational amplifier 324 and an output terminal of the second operational amplifier 324; the nineteenth switch 322 is also coupled between the inverting input terminal of the second operational amplifier 324 and the output terminal of the second operational amplifier 324.

The non-inverting input terminal of the second operational amplifier 324 is coupled with a common mode voltage source.

The cancelling module 21 may be the structure shown above, or may be other similar structures, the drawings are merely examples, and the present disclosure does not limit.

The on and off of the eighteenth switch 321 can be controlled by the reverse signal of the third control signal, and the on and off of the nineteenth switch 322 can be controlled by the third control signal.

In combination with the above example, during a charging phase of the reference capacitor 42 and a reverse charging phase of the second cancelling capacitor 222, the nineteenth switch 322 can be controlled to be on by the third control signal, such that the second feedback capacitor 323 is shorted and its capacitance is reset. In the charging phase of the reference capacitor 42, the second operational amplifier 324 outputs a converted voltage signal Vref after the circuit is stabilized.

In a positive charge transfer phase, the nineteenth switch 322 can be controlled to be off by the third control signal, and the eighteenth switch 321 is controlled to be on by the reverse signal of the third control signal, so that the second operational amplifier 324 converts a capacitive signal, which is obtained after the charge of the reference capacitor 42 is cancelled, into a voltage signal Vref and output it.

In a positive charging phase of the second cancelling capacitor 222, the nineteenth switch 322 can be controlled to be on by the third control signal, so that the second feedback capacitor 323 is shorted so that the capacitance of the second feedback capacitor 323 is reset, and the eighteenth switch 321 is controlled to be off by the reverse signal of the third control signal. In the positive charging phase of the second cancelling capacitor 222, the second operational amplifier 324 outputs the converted voltage signal Vref after the circuit is stabilized.

In a negative charge transfer phase, the nineteenth switch 322 can be controlled to be off by the third control signal, and the eighteenth switch 321 is controlled to be on by the reverse signal of the third control signal, so that the second operational amplifier 324 converts the capacitive signal, which is obtained after the charge of the reference capacitor 42 is canceled, into the voltage signal Vref and output it.

In each cycle, the waveforms of the first control signal SWP, the second control signal SWN, the third control signal SWR, the fourth control signal SWC, and the voltage signal Vref output by the second operational amplifier 324 may be similar to the above first control signal SWP, the above second control signal SWN, the above third control signal SWR, the above fourth control signal SWC, and the voltage signal Vout output by the above first operational amplifier 314, and details will not be described herein again.

In the detection circuit shown in FIG. 6, an output terminal of the second operational amplifier 324 can also be coupled to a filter 5 to send the output voltage signal of the second operational amplifier 324 to the filter, so that the filter 5 can perform band pass filtering for the voltage signal, for filtering out out-of-band noise or pre-processing such as anti-aliasing filtering, thereby avoiding occurrence of aliasing phenomenon in the digital signal converted by ADC 6.

The filter 5 is also coupled to the ADC 6 and configured to send the filtered voltage signal to the ADC 6, which converts the filtered voltage signal to a digital signal. The ADC 6 is also coupled to the DSP 7 which is configured to perform IQ demodulation for the digital signal and then output.

In the example corresponding to FIG. 6, for one detection capacitor 4, the filter 5 receives at least two paths of voltage signals, including the voltage signal output by the first operational amplifier 314, and the voltage signal output by the second operational amplifier 324. The two paths of voltage signals are filtered by the filter 5, and then can be input to differential input terminals of the ADC 6, i.e., a non-inverting input terminal ADCin+ and an inverting input terminal ADCin−, respectively, or the two paths of signals can also be input to input terminals of the ADC 6 after being filtered by the filter 5.

The ADC 6 can be configured to perform differential processing on the received two paths of signals and then convert them into a digital signal, and send them to the DSP 7. The DSP 7 performs the IQ demodulation on the digital signal.

In the detection circuit, after pre-stage pre-filtering antialiasing processing performed by the filter 5 and then sending the voltage signal to the ADC 6, the digital signal sampled by the ADC 6 is processed by processing algorithms such as digital filtering, IQ demodulation and digital integration by the DSP 7. Since IQ demodulation is employed for the digital signal obtained by the ADC 6, the detection scheme has an advantage of suppressing harmonic interference. By digitally integrating the I and Q values, a channel saturation problem introduced by an analog terminal integration is avoided, and an integration time of a digital integration circuit can be flexibly increased or decreased according to actual application scenarios, thereby reducing a signal detection bandwidth and improving the system SNR and anti-interference ability.

By a method of adding the reference capacitor for compensation, a capacitance measurement error caused by temperature fluctuation, deformation, or the like can be suppressed with maximum limitation, and the accuracy of capacitance detection is further improved. The reference capacitor can be, for example, a capacitor having a same material as the detection capacitor.

It should be noted that the above detection circuits are only some possible examples, and the detection circuit may also be other structures, and details are not described herein again.

Figure 7:
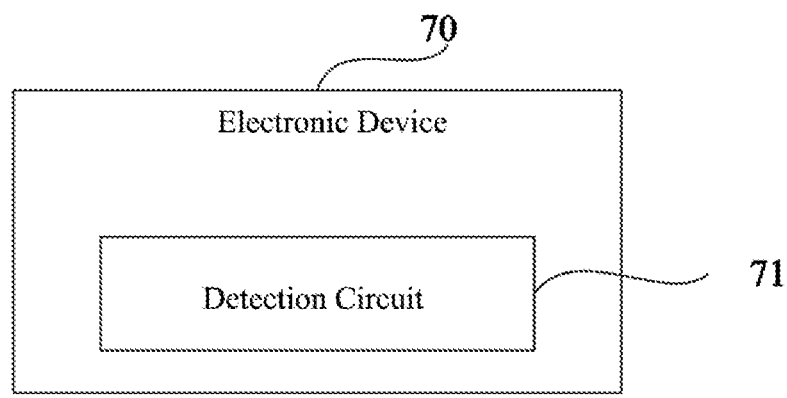
FIG. 7 is a schematic structural diagram of an electronic device according to an embodiment of the present disclosure.

An embodiment of the present disclosure further provides an electronic device. FIG. 7 is a schematic structural diagram of an electronic device according to an embodiment of the present disclosure. As shown in FIG. 7, the electronic device 70 may include a detection circuit 71.

The detection circuit 71 can be any detection circuit described in the above-mentioned FIG. 1 to FIG. 6.

In the electronic device, the detection circuit can implement cancellation of an initial capacitance of one detection capacitor through charge transfer in two directions by each cancelling module of a cancelling circuit, and a cancelling efficiency is higher, a capacitance detection sensitivity and detection accuracy are improved, while a dynamic range of capacitance detection is also improved.

It should be noted that the above embodiments are merely intended for describing, rather than limiting, the technical solutions of the present disclosure; although the present disclosure has been described in detail with reference to the foregoing embodiments, those skilled in the art will understand that they may still make modifications to the technical solutions described in the foregoing embodiments, or make equivalent substitutions to some or all of the technical features therein; and the modifications or substitutions do not make the essence of the corresponding technical solutions deviate from the scope of the technical solutions in the embodiments of the present disclosure.

What is claimed is:

1. A detection circuit, comprising: a driving circuit, a cancelling circuit, and a switching circuit;

the driving circuit comprises at least one driving module; each driving module is coupled to at least one detection capacitor and is configured to periodically charge the one detection capacitor;

the cancelling circuit comprises at least one cancelling module; each cancelling module is coupled to the one detection capacitor and is configured to cancel an initial capacitance of the one detection capacitor by charge transfer in two directions; and the switching circuit comprises at least one switching module; the each cancelling module is further coupled to one switching module which is configured to, after the initial capacitance of the one detection capacitor is cancelled, convert a capacitive signal of the one detection capacitor to a voltage signal and output;

wherein the each cancelling module comprises: a cancelling voltage source, a first cancelling capacitor, a third switch, a fourth switch, a fifth switch, a sixth switch, and a seventh switch;

one terminal of the first cancelling capacitor is coupled to the one detection capacitor through the third switch; the one terminal of the first cancelling capacitor is also coupled to the cancelling voltage source through the fourth switch, and is also coupled to the ground through the fifth switch; and the other terminal of the first cancelling capacitor is also coupled to the ground through the sixth switch, and is also coupled to the cancelling voltage source through the seventh switch.

2. The circuit according to claim 1, wherein the each driving module comprises: a driving voltage source, a first switch, and a second switch;

the driving voltage source is coupled to one terminal of the one detection capacitor through the first switch; the other terminal of the one detection capacitor is coupled to a ground; and the one terminal of the one detection capacitor is also coupled to the ground through the second switch.

3. The circuit according to claim 1, wherein the first cancelling capacitor is a tunable capacitor or a fixed capacitor.

4. The circuit according to claim 1, wherein the driving voltage source and the cancelling voltage source are a same voltage source.

5. The circuit according to claim 2, wherein the each switching module comprises: an eighth switch, a ninth switch, a first feedback capacitor, and an operational amplifier;

the each cancelling module is coupled to an inverting input terminal of the operational amplifier through the eighth switch;

the first feedback capacitor is coupled between the inverting input terminal of the operational amplifier and an output terminal of the operational amplifier; the ninth switch is also coupled between the inverting input terminal of the operational amplifier and the output terminal of the operational amplifier; and a non-inverting input terminal of the operational amplifier is coupled with a common mode voltage source.

6. The circuit according to claim 5, wherein an output voltage of the common mode voltage source is ½ of the driving voltage source.

7. The circuit according to claim 1, wherein the circuit further comprises:

a filter, an analog to digital converter (ADC) and a digital signal processor (DSP);

an output terminal of the switching circuit is coupled to the filter; the filter is coupled to the ADC, and the ADC is further coupled to the DSP;

the filter is configured to perform band pass filtering on at least one path of voltage signal output by the at least one switching module;

the ADC is configured to convert at least one path of filtered signal into a digital signal; and the DSP is configured to perform in-phase quadrature (IQ) demodulation on the digital signal and then output.

8. The circuit according to claim 2, wherein the circuit further comprises:

a filter, an analog to digital converter (ADC) and a digital signal processor (DSP);

an output terminal of the switching circuit is coupled to the filter; the filter is coupled to the ADC, and the ADC is further coupled to the DSP;

the filter is configured to perform band pass filtering on at least one path of voltage signal output by the at least one switching module;

the ADC is configured to convert at least one path of filtered signal into a digital signal; and the DSP is configured to perform in-phase quadrature (IQ) demodulation on the digital signal and then output.

9. The circuit according to claim 1, wherein the circuit further comprises:

a filter, an analog to digital converter (ADC) and a digital signal processor (DSP);

an output terminal of the switching circuit is coupled to the filter; the filter is coupled to the ADC, and the ADC is further coupled to the DSP;

the filter is configured to perform band pass filtering on at least one path of voltage signal output by the at least one switching module;

the ADC is configured to convert at least one path of filtered signal into a digital signal; and the DSP is configured to perform in-phase quadrature (IQ) demodulation on the digital signal and then output.

10. The circuit according to claim 7, wherein if a number of the detection capacitor is multiple, then the ADC is further configured to perform differential processing on multiple paths of filtered signals, and convert them into digital signals.

11. An electronic device, comprising: a detection circuit; the detection circuit comprises: a driving circuit, a cancelling circuit, and a switching circuit;

the driving circuit comprises at least one driving module; each driving module is coupled to at least one detection capacitor and is configured to periodically charge the one detection capacitor;

the cancelling circuit comprises at least one cancelling module; each cancelling module is coupled to the one detection capacitor and is configured to cancel an initial capacitance of the one detection capacitor by charge transfer in two directions; and the switching circuit comprises at least one switching module; the each cancelling module is further coupled to one switching module which is configured to, after the initial capacitance of the one detection capacitor is cancelled, convert a capacitive signal of the one detection capacitor to a voltage signal and output;

wherein the each cancelling module comprises: a cancelling voltage source, a first cancelling capacitor, a third switch, a fourth switch, a fifth switch, a sixth switch, and a seventh switch;

one terminal of the first cancelling capacitor is coupled to the one detection capacitor through the third switch; the one terminal of the first cancelling capacitor is also coupled to the cancelling voltage source through the fourth switch, and is also coupled to the ground through the fifth switch; and the other terminal of the first cancelling capacitor is also coupled to the ground through the sixth switch, and is also coupled to the cancelling voltage source through the seventh switch.

12. The device according to claim 11, wherein the each driving module comprises: a driving voltage source, a first switch, and a second switch;

the driving voltage source is coupled to one terminal of the one detection capacitor through the first switch; the other terminal of the one detection capacitor is coupled to a ground; and the one terminal of the one detection capacitor is also coupled to the ground through the second switch.

13. The device according to claim 11, wherein the first cancelling capacitor is a tunable capacitor or a fixed capacitor.

14. The device according to claim 11, wherein the driving voltage source and the cancelling voltage source are a same voltage source.

15. The device according to claim 12, wherein the each switching module comprises: an eighth switch, a ninth switch, a first feedback capacitor, and an operational amplifier;

the each cancelling module is coupled to an inverting input terminal of the operational amplifier through the eighth switch;

the first feedback capacitor is coupled between the inverting input terminal of the operational amplifier and an output terminal of the operational amplifier; the ninth switch is also coupled between the inverting input terminal of the operational amplifier and the output terminal of the operational amplifier; and a non-inverting input terminal of the operational amplifier is coupled with a common mode voltage source.

16. The device according to claim 15, wherein an output voltage of the common mode voltage source is ½ of the driving voltage source.

17. The device according to claim 11, wherein the device further comprises:

a filter, an analog to digital converter (ADC) and a digital signal processor (DSP);

an output terminal of the switching circuit is coupled to the filter; the filter is coupled to the ADC, and the ADC is further coupled to the DSP;

the filter is configured to perform band pass filtering on at least one path of voltage signal output by the at least one switching module;

the ADC is configured to convert at least one path of filtered signal into a digital signal; and the DSP is configured to perform in-phase quadrature (IQ) demodulation on the digital signal and then output.

18. The device according to claim 17, wherein if a number of the detection capacitor is multiple, then the ADC is further configured to perform differential processing on multiple paths of filtered signals, and convert them into digital signals.

* * * * *